Sept. 10, 1935. R. SPELLING 2,013,769
PROCESS AND APPARATUS FOR THE RECOVERY OF THE
CONSTITUENTS OF PHOTOGRAPHIC FILM MATERIAL
Filed May 21, 1932
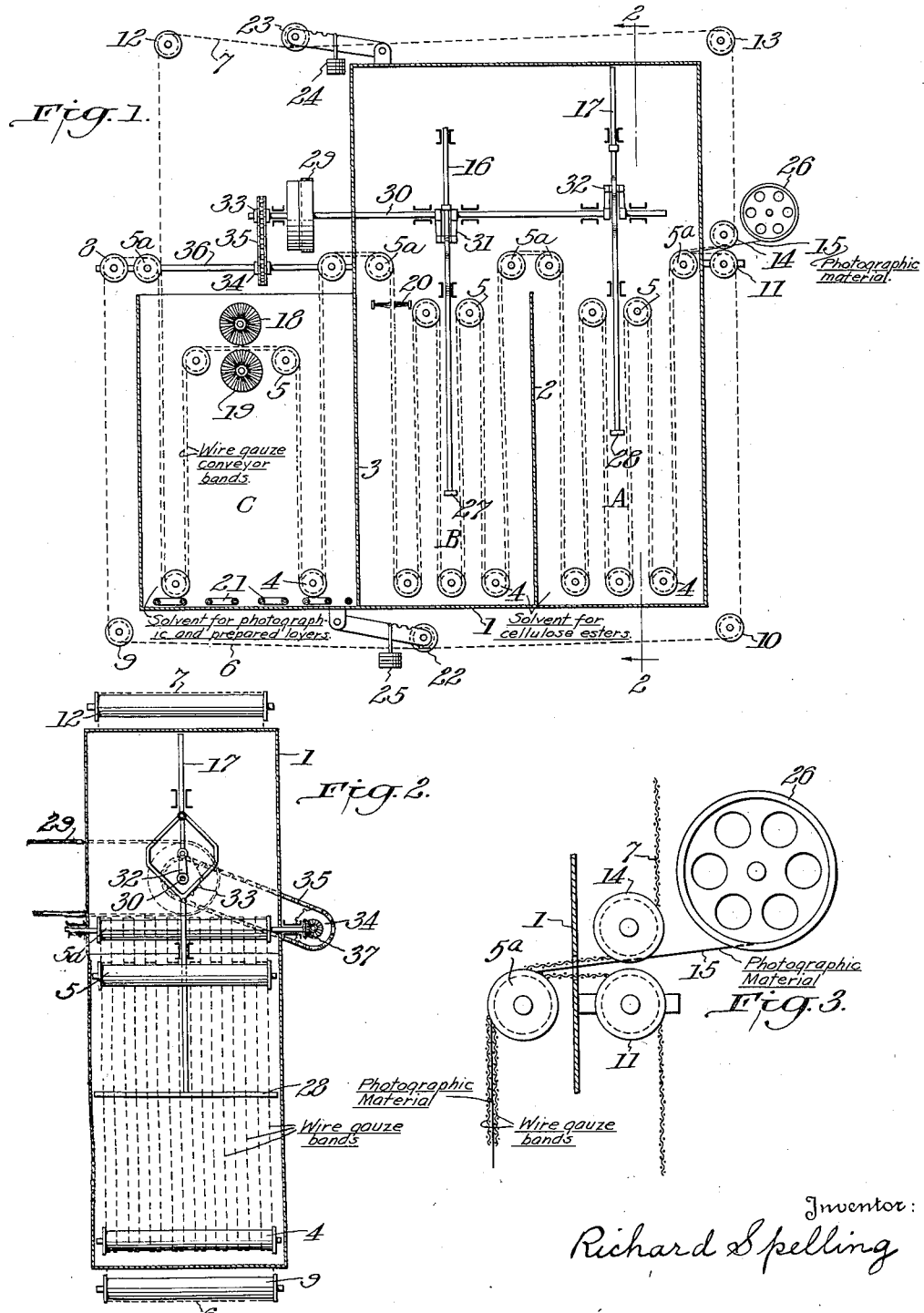

Patented Sept. 10, 1935

2,013,769

UNITED STATES PATENT OFFICE 2,013,769

PROCESS AND APPARATUS FOR THE RECOVERY OF THE CONSTITUENTS OF PHOTOGRAPHIC FILM MATERIAL

Richard Spelling, Berlin-Grunau, Germany

Application May 21, 1932, Serial No. 612,788
In Germany May 22, 1931

3 Claims. (Cl. 23—268)

The present invention relates to process and apparatus for the recovery of the constituents of photographic film material.

In accordance with the invention the photographic film, the constituents of which are to be recovered, is first passed through one or more chambers charged with a solvent for the cellulose ester of the film, whereby the cellulose ester is dissolved, with the result that ultimately, only a thin film still remains, consisting of the true photographic layer and the so-called prepared layer which generally consists of albumen and serves to promote adhesion between the true photographic layer and the cellulose ester support. These latter two layers are then dissolved in one or more chambers filled with a solvent for the photographic and the prepared layer, for example, warm water.

Now, since during the dissolution of the cellulose ester layer, the strength of the film diminishes progressively and ultimately there remain only the photographic layer and the prepared layer, the mechanical strength of the film decreases to such an extent that special means become necessary to prevent tearing of the thus weakened film. In accordance with the present invention this tearing of the film is avoided by placing the film between two bands of wire gauze, which are conducted parallelly in a zigzag path through the solvent for the cellulose ester and one or more chambers filled with a solvent for the photographic and prepared layer, for example, warm water. In this manner the film is protected to a large extent from mechanical strain and in particular from tearing strain, with the result that the cellulose ester can be removed practically completely from the albumen layer without mechanical destruction of the latter taking place.

The machine, the subject of the present invention, is illustrated diagrammatically in the accompanying drawing.

Figure 1 shows a diagrammatic longitudinal section,

Figure 2 a transverse section through the machine at the position indicated in Figure 1 by line 2—2, and Fig. 3 shows positions of the two wire gauze bands with the photographic film held between them.

In Figure 1, 1 is a container divided into three chambers, A, B and C, by means of transverse walls 2 and 3. Chambers A and B are charged with a solvent for the cellulose esters present in the film material to be treated. Chamber C is filled with water, which is heated by means of the hot coils 21.

Two endless revolving bands 6 and 7, consisting of wire gauze, are passed through these chambers by means of the rollers, 4, 5 and 5a. The rollers 5 are so adjustable that their distance from the rollers 4 and consequently the length of travel of the revolving bands in the chambers can be altered. The revolving bands 6 and 7 pass externally back to the machine over the rollers 8, 9, 10 and 11 and 12, 13 and 14, respectively, and the tension of the bands can be regulated by means of the tensioning rollers 22 and 23 by an appropriate adjustment of the weights 25 and 24.

The film material is placed between the revolving bands by means of the rollers 11 and 14 and indeed longer lengths, such as for example, played out cine films, can with advantage be led to the rollers 11 and 14 from the reel 26, placed in front, in such a manner that the film is automatically unwound and fed into the revolving bands without special attention.

The film is now led between the revolving bands over the rollers 4, 5 and 5a through the chambers A and B, filled with a solvent for the cellulose esters, with the result that the cellulose esters are dissolved. The solution of the esters can be expedited by agitation of the solution, for example, by the use of the stirrers 16 and 17. Moreover, the ends 27 and 28 of the stirrers can be constructed in the form of brushes, which mechanically promote the solution of the cellulose ester layer by brushing and keeping the mesh of the revolving bands free from concentrated cellulose ester solution or swollen cellulose ester.

At the point where the revolving bands leave the chamber B which is filled with a solvent for the cellulose ester a mechanical device is introduced with advantage, for example, a brush 20, which removes the solvent adhering to the revolving bands and to the film residue between the bands and prevents the carrying over of considerable quantities of the solvent into the chamber C which is filled with warm water.

In chamber C the photographic layer and the prepared layer are now dissolved by means of warm water. This process of dissolution can be facilitated by mechanical treatment of the film lying between the revolving bands by means of brushes 18 and 19. The revolving bands 6 and 7 which are by this time free from the last residues of film then leave the water chamber C and return to the rollers 11 and 14 after passing over the rollers 8, 9 and 10 and 12 and 13, respectively, and there take up new film material.

It should still be observed, as may be seen from the illustration, that chambers A and B should with advantage be closed as completely as possible to prevent considerable loss of the solvent by evaporation. The motive power of the machine can be provided through the pulley belt 29 by the use of a suitable power machine (not shown). This pulley belt works the stirrers 16 and 17 by means of the shaft 30 and the crank mechanism 31 and 32. From the shaft 30, for example by means of two chain sprockets 33 and 34 and a chain 35 the shaft 36 can be driven in a suitable manner and from the shaft 36 the rollers 5a, 8 and 11 are driven, for example by means of a bevel wheel 37.

I claim:

1. Method for the recovery of the constituents of photographic film which comprises supporting the photographic film between travelling endless bands of wire gauze and passing the film while it is so supported successively through a plurality of bodies of solvents for said constituents.

2. Process as defined in claim 1 in which the film is passed successively through a bath of a solvent for cellulose ester and a bath of water.

3. A device for the recovery of the constituents of photographic film material which comprises a container which is divided by means of transverse walls into three chambers for solvents for said constituents, rollers associated with said chambers, two endless revolvable bands of wire gauze arranged to pass over said rollers through the said container in parallel relationship to each other and to carry the said photographic film material between them down into, through and up out of the three chambers successively, and a mechanically actuated stirrer in at least one of said chambers the lower end of which is constructed in the form of a brush, said brush being located so as to contact with one of said wire gauze bands.

RICHARD SPELLING.